United States Patent
Loomans et al.

(10) Patent No.: US 9,988,881 B2
(45) Date of Patent: Jun. 5, 2018

(54) SURFACE REPRESENTATION FOR MODELING GEOLOGICAL SURFACES

(71) Applicants: Marijn Loomans, The Hague (NL); Robert Hartman, Wateringen (NL)

(72) Inventors: Marijn Loomans, The Hague (NL); Robert Hartman, Wateringen (NL)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days. days.

(21) Appl. No.: 15/130,053

(22) Filed: Apr. 15, 2016

(65) Prior Publication Data

US 2017/0298712 A1    Oct. 19, 2017

(51) Int. Cl.
| | | |
|---|---|---|
| G06T 17/05 | (2011.01) | |
| G06T 17/20 | (2006.01) | |
| E21B 41/00 | (2006.01) | |
| E21B 7/00 | (2006.01) | |
| E21B 43/26 | (2006.01) | |
| E21B 43/12 | (2006.01) | |

(52) U.S. Cl.
CPC ............ *E21B 41/0092* (2013.01); *E21B 7/00* (2013.01); *E21B 43/12* (2013.01); *E21B 43/26* (2013.01)

(58) Field of Classification Search
None
See application file for complete search history.

(56) References Cited

U.S. PATENT DOCUMENTS

| | | | |
|---|---|---|---|
| 9,366,121 B2 * | 6/2016 | Copeland | E21B 43/26 |
| 9,416,642 B2 * | 8/2016 | Bai | G06F 17/5009 |
| 9,556,720 B2 * | 1/2017 | Onda | E21B 43/26 |
| 2010/0081184 A1 * | 4/2010 | Downey | E21B 43/006 |
| | | | 435/167 |
| 2011/0125476 A1 * | 5/2011 | Craig | E21B 43/16 |
| | | | 703/10 |
| 2014/0052427 A1 * | 2/2014 | Yahiaoui | G06T 17/05 |
| | | | 703/10 |

OTHER PUBLICATIONS

Jackson, et al.; "Reservoir Modeling for Flow Simulatioin by Use of Surfaces, Adaptive Unstructured Meshes, and an Overlapping Control Volume Finite Element Method"; 2015; SPE Reservoir Evaluation & Engineering; 18 pages.

* cited by examiner

*Primary Examiner* — Barry Drennan
*Assistant Examiner* — Jason Pringle-Parker
(74) *Attorney, Agent, or Firm* — Cantor Colburn LLP

(57) ABSTRACT

A method for developing a subterranean field includes: receiving a representation of a rock surface in the subterranean field, the representation having a boundary; defining a set of grid planes over the representation; defining a plurality of core nodes at intersections of the grid planes that are within the boundary; defining core lines to connect each core node with each adjacent core node along the set of grid planes; defining a plurality of plane nodes on the grid planes where each grid plane intersects the boundary; defining plane lines to connect each plane node with each adjacent plane node along the grid planes; defining outlier nodes at each vertex of the boundary; and defining boundary lines connecting each of the plane nodes and each of the outlier nodes along the boundary. The method further includes operating equipment using at least one definition in order to develop the subterranean field.

22 Claims, 19 Drawing Sheets

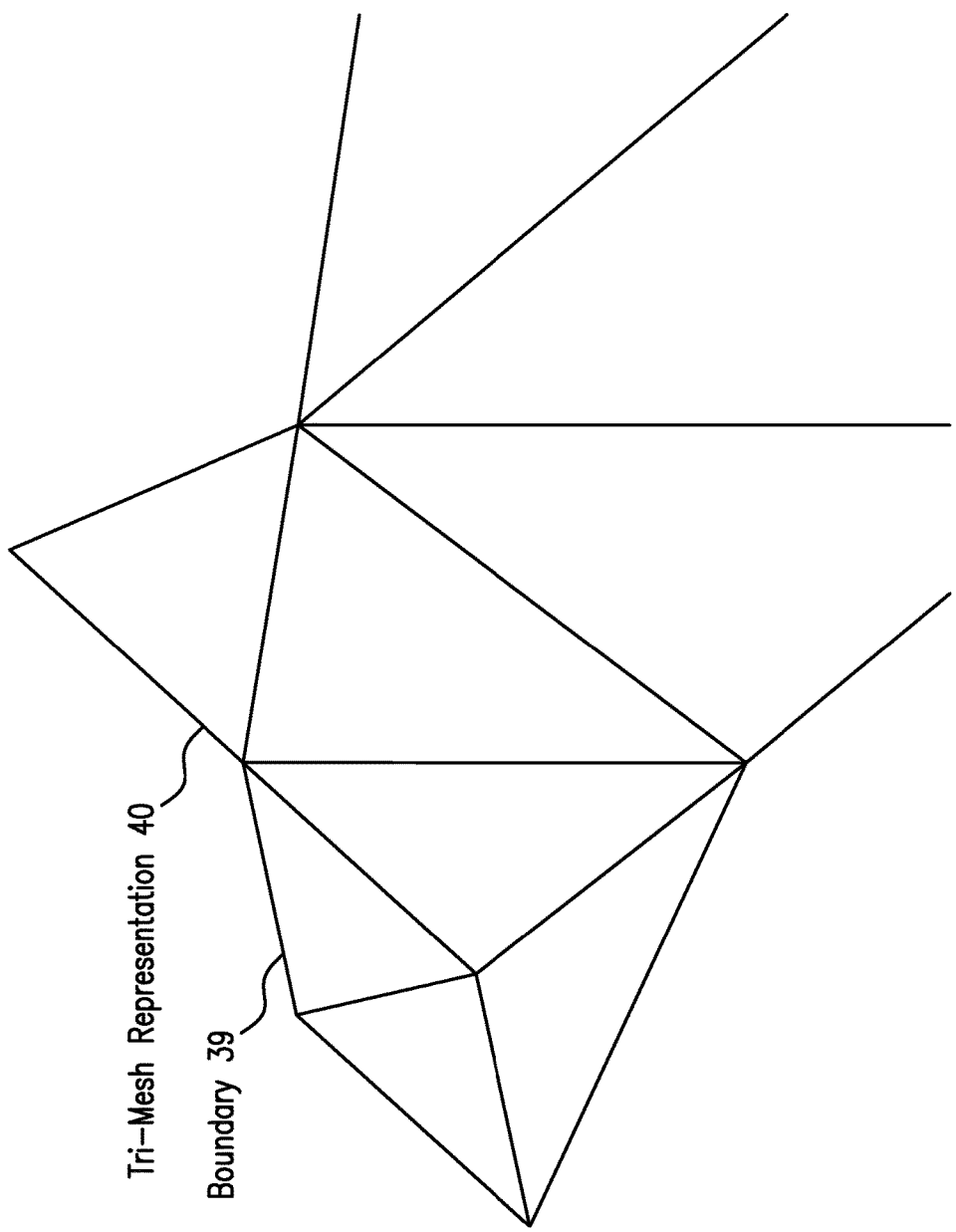

US 9,988,881 B2

SURFACE REPRESENTATION FOR MODELING GEOLOGICAL SURFACES

BACKGROUND

Mathematical models of geological formations have many uses for hydrocarbon production. Formation models may include both rock fractures and faults and distinct transitions between different deposited rock formations that can contribute to the flow and containment of hydrocarbons and thus provide an estimate of an amount of producible hydrocarbons. Once the amount is estimated, further steps may be taken such as determining the economic feasibility of production from the formation and a suitable location of a well. Other factors may also be determined from the formation model such as stress at each of the fractures and subsidence of formation rock and likelihood of an earthquake after extraction. The accuracy of corresponding estimations and determinations depends on the accuracy of the formation model. Hence, improvement in the accuracy of formation models would be well received in the drilling and production industries.

BRIEF SUMMARY

Disclosed is a method for developing a subterranean field. The method includes: receiving a representation of a rock surface in the subterranean field using a processor, the representation having a boundary; defining a set of grid planes over the representation using the processor; defining a plurality of core nodes at intersections of the grid planes that are within the boundary using the processor; defining core lines to connect each core node with each adjacent core node along the set of grid planes using the processor; defining a plurality of plane nodes on the grid planes where each grid plane intersects the boundary using the processor; defining plane lines to connect each plane node with each adjacent plane node along the grid planes using the processor; defining outlier nodes at each vertex of the boundary using the processor; defining boundary lines connecting each of the plane nodes and each of the outlier nodes along the boundary using the processor; and operating equipment using at least one definition in order to develop the subterranean field.

Also disclosed is a method for developing a subterranean field. The method includes: constructing, using a processor, a model of a rock surface in the subterranean field from a representation of the structure having a boundary. The model includes: a plurality of core nodes defined at intersections of grid planes that are within the boundary, the grid planes being in a set of grid planes over the representation; core lines defined by connecting each core node with each adjacent core node along the set of grid planes; a plurality of plane nodes defined on the grid planes where each grid plane intersects the boundary; plane lines defined by connecting each plane node with each adjacent plane node along the grid planes; outlier nodes defined at each vertex of the boundary; and boundary lines defined by connecting each of the plane nodes and each of the outlier nodes along the boundary. The method further includes developing the subterranean field using the model and development equipment.

BRIEF DESCRIPTION OF THE DRAWINGS

The following descriptions should not be considered limiting in any way. With reference to the accompanying drawings, like elements are numbered alike:

FIG. 3 depicts aspects of a tri-mesh representation of the surface of a formation rock;

DETAILED DESCRIPTION

A detailed description of one or more embodiments of the disclosed apparatus and method presented herein by way of exemplification and not limitation with reference to the figures.

Disclosed is a method implemented by a processor for representing a surface of rock in a mathematical model of a geological formation. The surface may represent a fault boundary. The surface may also represent a horizon, an unconformity, an intrusion and/or other features of interest. The method improves the accuracy of representing the boundary and, thus, improves the accuracy of further processing to estimate or determine various factors related to the formation such as permeability. The various factors in turn may be used to perform an action related to the earth formation such as determining a location for drilling a borehole, drilling a borehole at the determined location with a specific geometry, or extracting hydrocarbons according to a production process.

Figure 1:
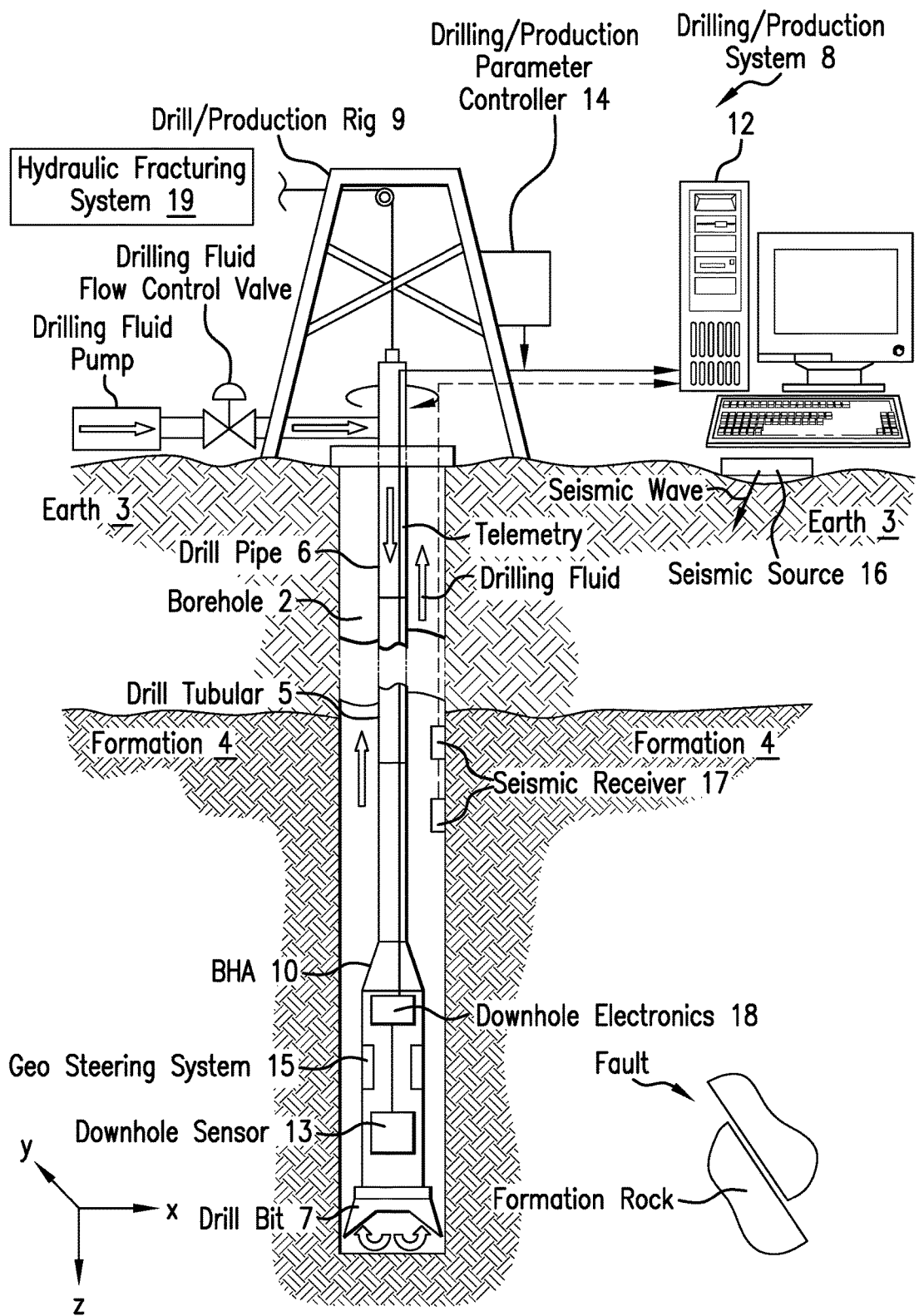
FIG. 1 depicts aspects of an earth formation penetrated by a borehole.

Apparatus for implementing the disclosure and features related to the disclosure is now discussed. FIG. 1 is a cross-sectional view of a borehole 2 penetrating the earth 3, which includes a formation 4. The formation 4 includes formation rock that has faults or fractures. A seismic source 16 is configured to emit a seismic wave that travels through the formation 4 and is received by seismic receivers 17. Data from the seismic receivers is processed by a computer processing system 12 to provide a tri-mesh representation of the surfaces of the formation rock to include faults and how the faults are interconnected. The tri-mesh representation geometry includes a boundary.

A drilling/production system 8 includes a drill/production rig 9 that is configured to drill the borehole 2 and/or extract hydrocarbons from the formation 4 via the borehole 2. A drill bit 7 is disposed at the distal end of a drill tubular 5 for drilling the borehole 2. The drill tubular 5 may be a drill string made up of a plurality of connected drill pipes 6. Drilling fluid or mud is pumped through the drill tubular 5 to lubricate the drill bit 7 and flush cuttings from the borehole 2. The drilling fluid is pumped by a drilling fluid pump and a flow rate of the drill fluid is controlled by a drilling fluid control valve. The drilling fluid pump and flow control valve may be controlled by a drilling/production parameter controller 14 to maintain a suitable pressure and flow rate to prevent the borehole 2 from collapsing. Suitable drilling fluid pressure and flow parameters may be determined by knowing the stresses of the formation rock, which can be determined from representation of the surfaces of the formation rock. The drilling/production parameter controller 14 is configured to control, such as by feedback control for example, parameters used to drill the borehole 2 and/or extract hydrocarbons via the borehole 2. Suitable flow rate for extraction may be determined from knowing the porosity of the formation rock, which can be determined from representation of the surfaces of the formation rock. The drill tubular 5 includes a bottomhole assembly (BHA) 10. The BHA 10 includes a downhole sensor 13 configured for sensing various downhole properties or parameters related to the formation 4, the borehole 2, and/or position of the BHA 10. Sensor data may be transmitted to the surface by telemetry for processing such as by the computer processing system 12. The BHA 10 may also include a geo-steering system 15. The geo-steering system 15 is configured to steer the drill bit 7 in order to drill the borehole 2 according to a selected path or geometry. The path or geometry in general is selected to optimize hydrocarbon production from the borehole 2 and to ensure that the stress on the formation due to the borehole along the path does not exceed the strength of the formation material. The optimized geometry may be determined from representation of the surfaces of the formation rock. Steering commands may be transmitted from the drilling/production parameter controller 14 to the geo-steering system 15 by the telemetry. Telemetry in one or more embodiments may include mud-pulse telemetry or wired drill pipe. Downhole electronics 18 may process data downhole and/or act as an interface with the telemetry. FIG. 1 also illustrates a hydraulic fracturing system 19 that is configured to fracture rock of the formation 4 by pumping fracturing fluid at high pressure into the borehole 2.

Figure 2A:
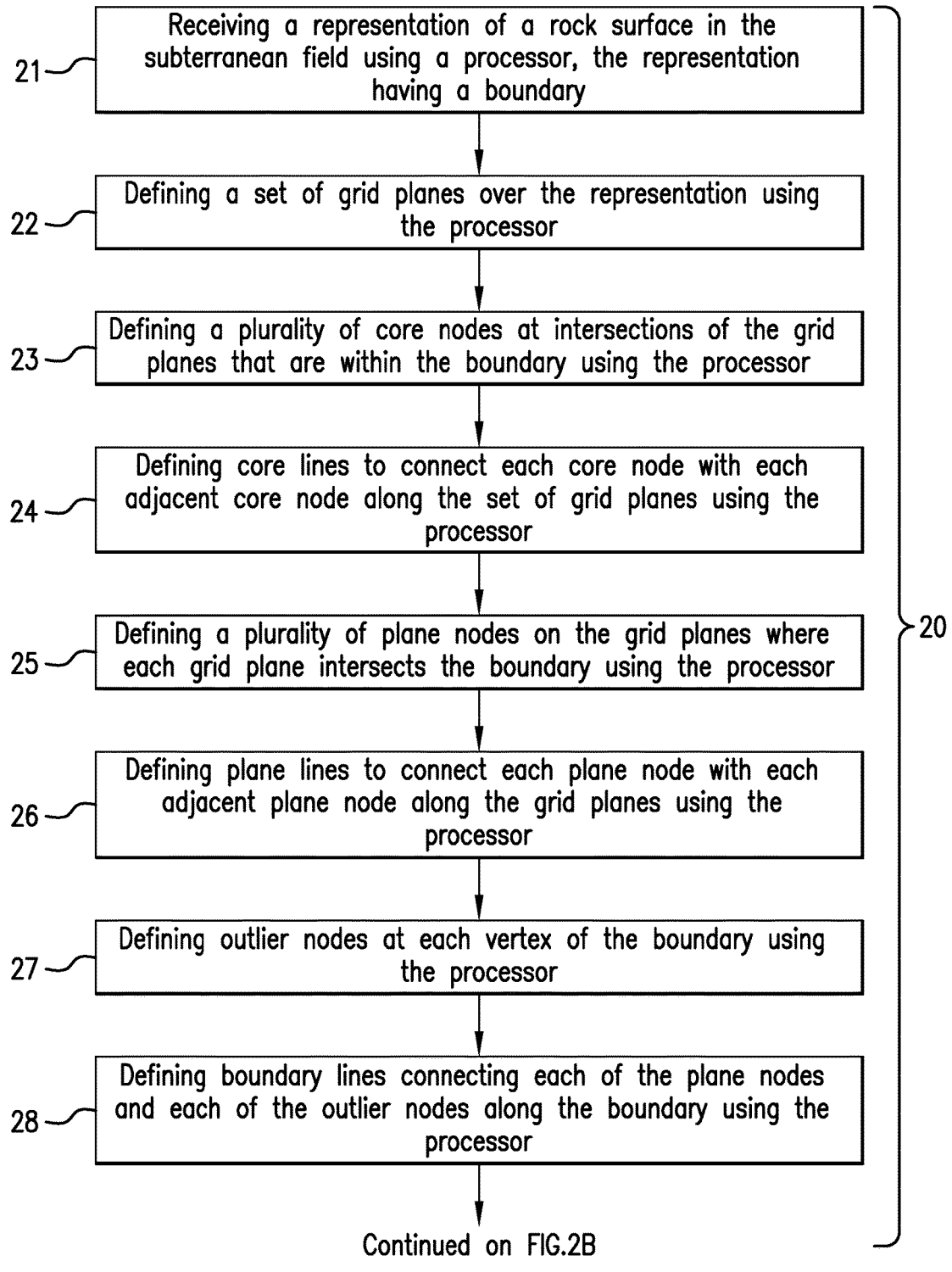
FIGS. 2A and 2B, collectively referred to as FIG. 2, present a flow chart for a method for representing rock surfaces in regular structures that represent an earth formation in a geological model.
Figure 2B:
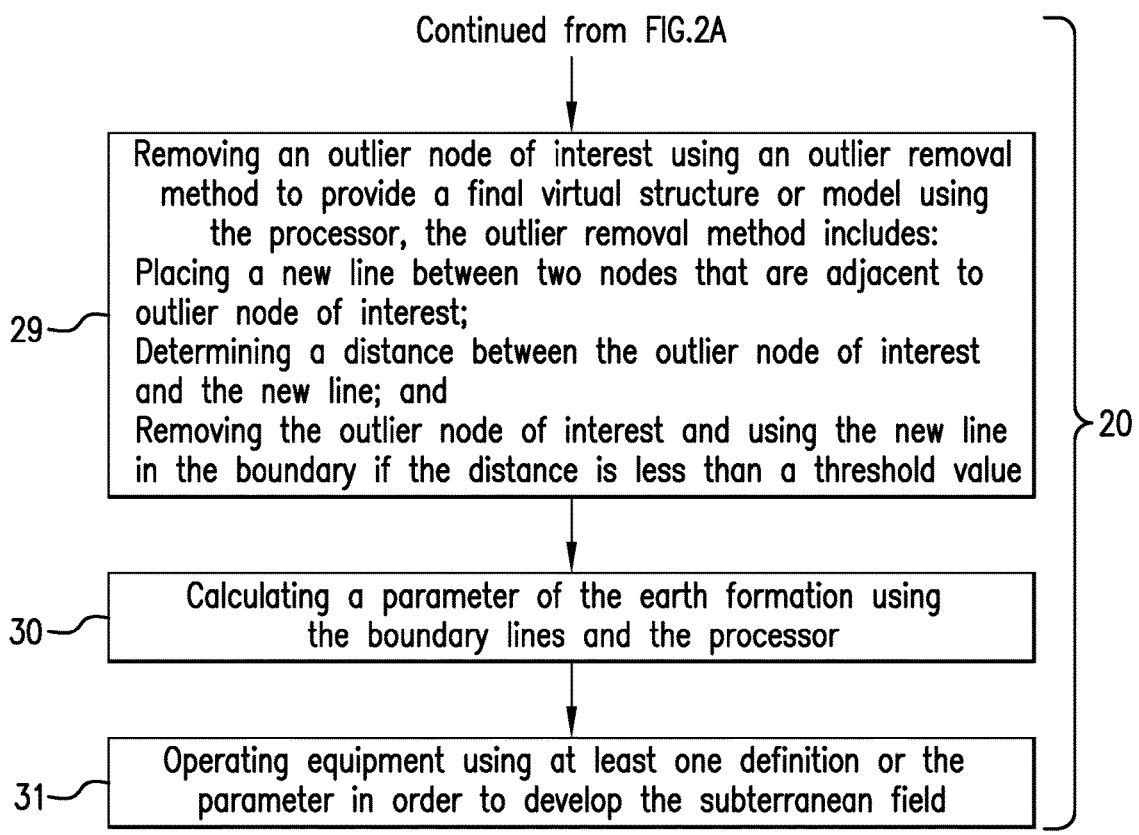

FIG. 2 is a flow chart for a method 20 for representing a structure of a rock surface in a plane in an earth formation. The term "surface" relates to various geological features that may be represented such as: rock boundaries, rock fractures (faults), depositional transitions (horizons), erosion events (unconformities), salt domes (intrusions) or similar geological features. Blocks in the method 20 are implemented by a processor such as in a computer processing system for example. Block 21 calls for receiving a representation of a rock surface in the subterranean field using a processor, the representation having a boundary. One embodiment of a tri-mesh representation 40 that includes a boundary 39 is illustrated in FIG. 3. The tri-mesh representation and how it is obtained is generally known in the art. In one or more embodiments, the tri-mesh representation is obtained from seismic data. The seismic data is acquired by emitting seismic waves into the earth using one or more seismic sources and receiving the seismic waves after they have traveled through the formation using one or more seismic receivers or transducers disposed on land, floating in water or in a borehole such as the borehole 2 penetrating the formation. The seismic waves are modified by the features of the formation rock such as faults and fault geometry. Hence, the received seismic waves contain information about features and geometry of the features. Locations of the features are obtained using processing techniques such as triangulation for example. The tri-mesh representation relates to using multiple interconnected triangles where adjacent triangles share two nodes and a common edge as is known in the art. However, due to resampling, a tri-mesh representation may not provide the most accurate geometric representation of the formation rock features for further processing to compute various formation factors such as permeability or stress. Consequently, the method 20 transforms the tri-mesh representation of formation rock surfaces into a more optimal surface representation for the further processing.

Figure 4:
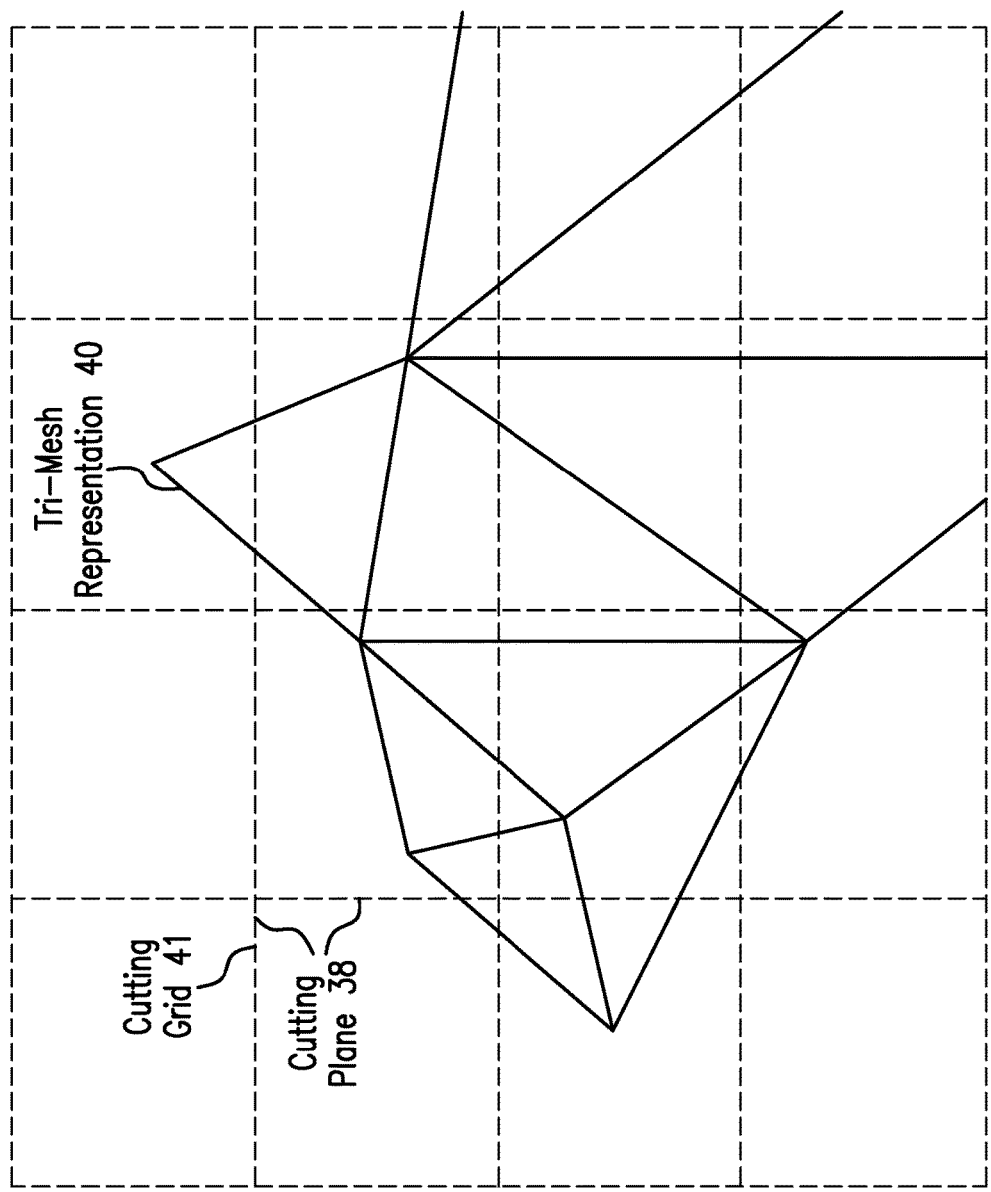
FIG. 4 depicts aspects of a cutting grid overlaid on the tri-mesh representation.

Block 22 calls for defining a set of grid planes over the representation using the processor. In one or more embodiments, this block may include overlaying a cutting grid having grid planes over the rock surface. One embodiment of a cutting grid 41 having a set of grid planes 38 is illustrated in FIG. 4. In FIG. 4, the cutting grid 41 is overlaid upon the tri-mesh representation 40 of FIG. 3. The cutting grid 41 has a first set of flat planes that are orthogonal to a second set of flat planes, as seen from the side of these planes. Other cutting grid configurations may also be used.

Figure 5:
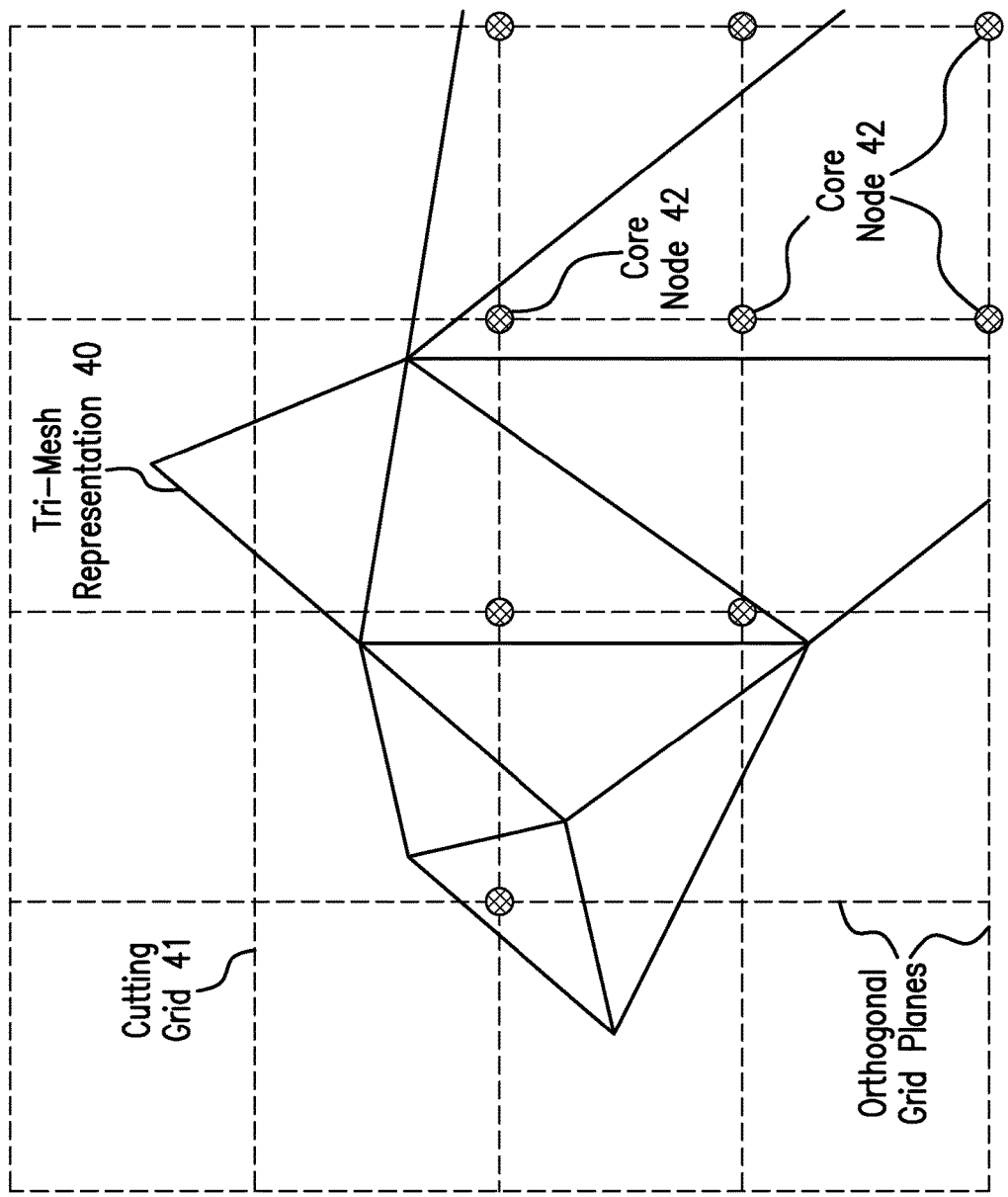
FIG. 5 depicts aspects of placing core nodes as cutting grid intersections.

Block 23 calls for defining a plurality of core nodes at intersections of the grid planes that are within the boundary using the processor. In one or more embodiments, this block may include placing core nodes at intersections of the grid planes of the cutting grid that are within a boundary of the tri-mesh representation at a depth derived from the tri-mesh representation using the processor. FIG. 5 illustrates defining a plurality of core nodes 42 at the core grid intersections from FIG. 4. Depth of each core node 42 may be interpreted from intersected triangle in the tri-mesh representation 40.

Figure 6:
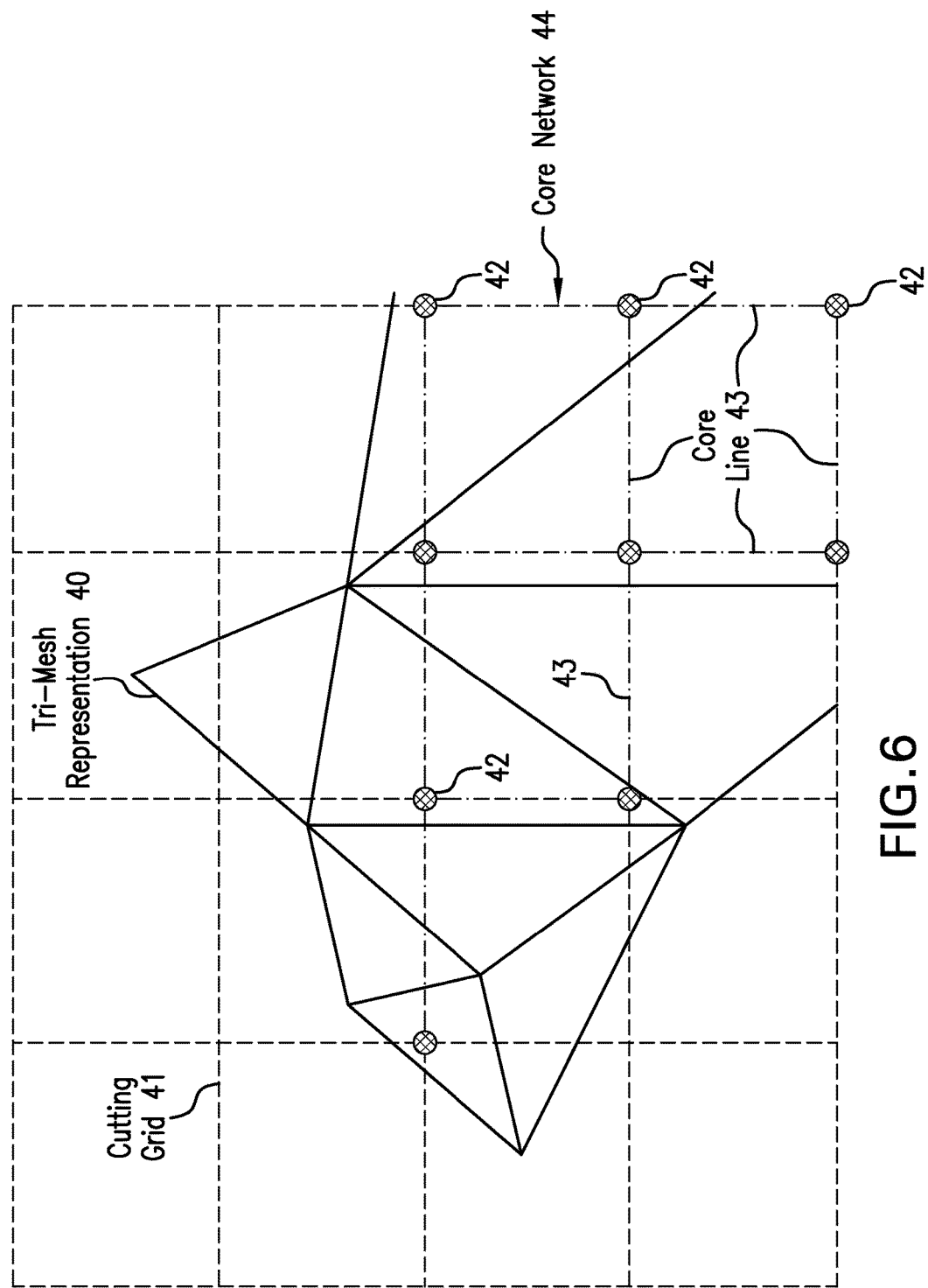
FIG. 6 depicts aspects of placing core lines between core nodes.

Block 24 calls for defining core lines to connect each core node with each adjacent core node along the set of grid planes using the processor. In one or more embodiments, this block may include connecting adjacent core nodes with core lines to provide a core network using the processor. FIG. 6 illustrates core lines 43, which may be obtained by connecting adjacent core nodes 42 from FIG. 5 with the core lines 43 to provide a core network 44. Note that the lines can be represented either explicitly by actual objects or they can be represented implicitly through storing their mutual relationship within the nodes or elsewhere.

Figure 7:
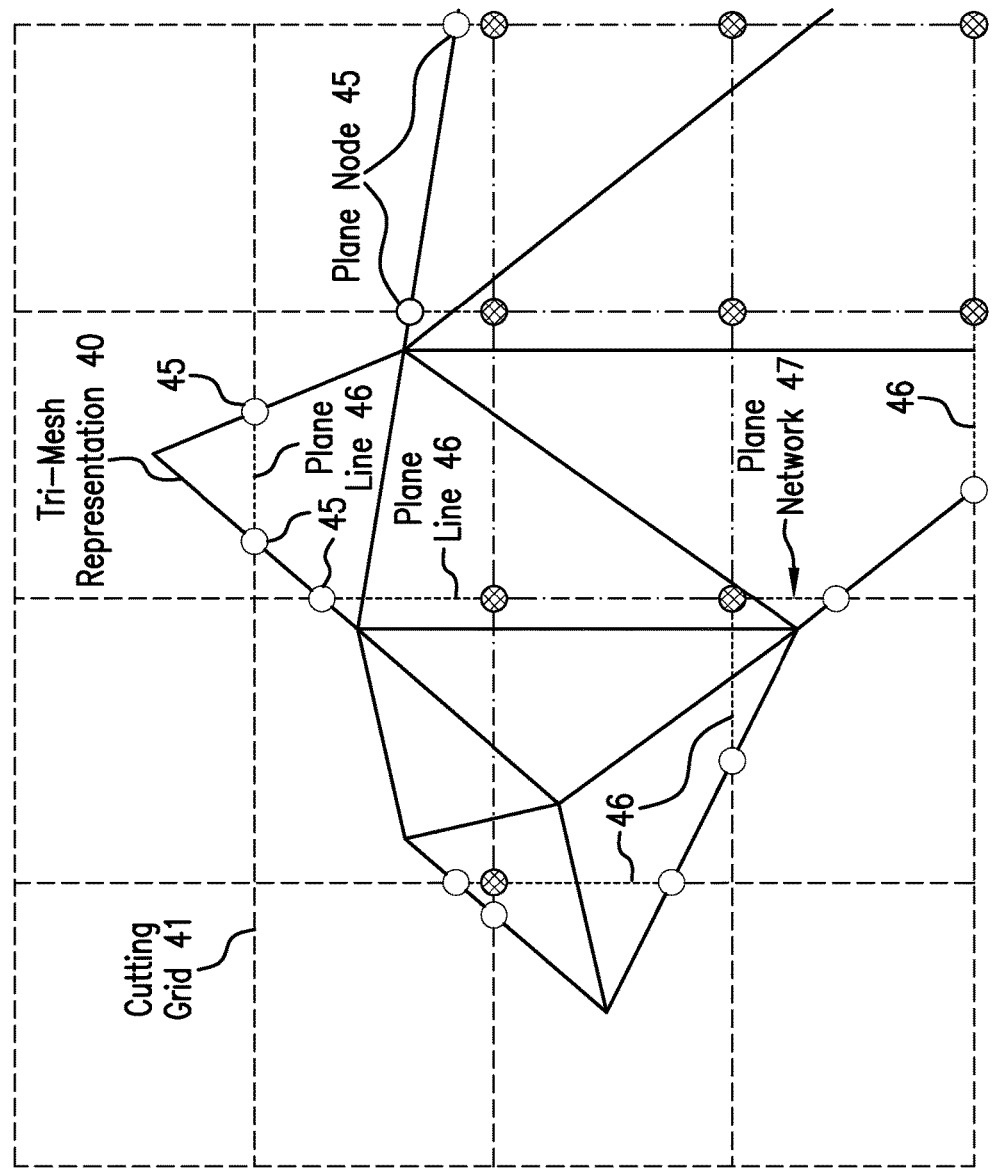
FIG. 7 depicts aspects of placing plane nodes and plane lines where triangles intersect with the cutting grid outside of the core nodes and lines.

Block 25 calls for defining a plurality of plane nodes on the grid planes where each grid plane intersects the boundary using the processor. In one or more embodiments, this block may include placing the plane nodes on grid lines of the cutting grid where edges of outer triangles of the tri-mesh representation intersect the grid planes outside of the core network using the processor. FIG. 7 illustrates a plurality of plane nodes 45 on grid planes of the cutting grid 41 where triangles of the tri-mesh representation 40 intersect those grid planes outside of the core network 44 from FIG.

6. Depth of each plane node 45 may be interpreted from the triangle in the tri-mesh representation 40.

Block 26 calls for defining plane lines to connect each plane node with each adjacent plane node along the grid planes using the processor. In one or more embodiments, this block may include connecting adjacent plane nodes with plane lines to provide a plane network outside of the core network using the processor. FIG. 7 illustrates plane lines 46 defined by the connecting of adjacent plane nodes 45 on the grid planes to provide a plane network 47 outside of the core network 44 from FIG. 6. Note that the lines can be represented either explicitly by actual or virtual objects or they can be represented implicitly through storing their mutual relationship with respect to the nodes or elsewhere.

Figure 8:
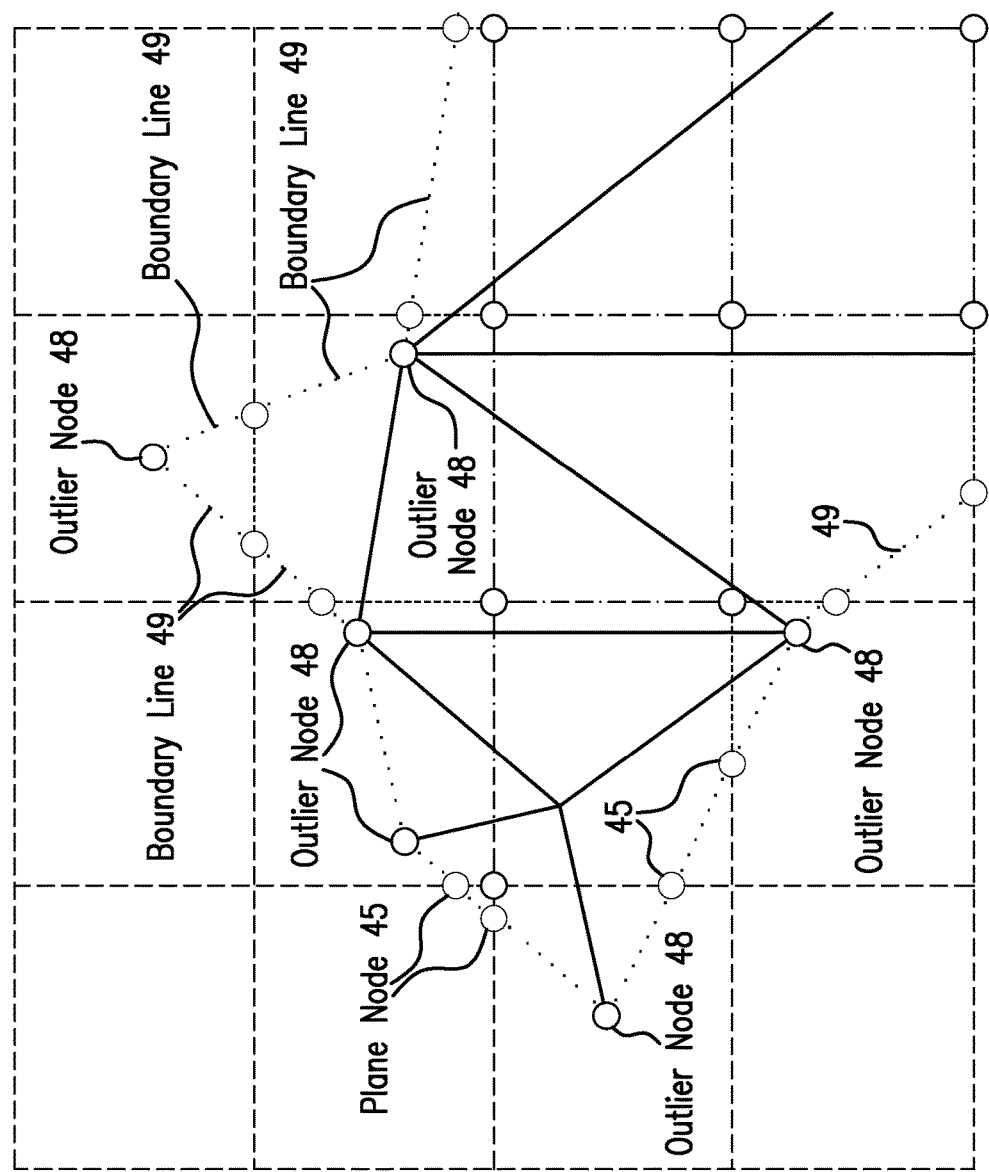
FIG. 8 depicts aspects of placing outlier nodes on the cutting grid between grid lines.

Block 27 calls for defining outlier nodes at each vertex of the boundary using the processor. In one or more embodiments, this block may include placing outlier nodes at each vertex of the tri-mesh representation that is between grid planes and outside of the plane network at a depth derived from the tri-mesh representation using the processor. FIG. 8 illustrates outlier nodes 48 placed at each vertex of the tri-mesh representation that is between grid planes (i.e., not on a grid plane) and outside of the plane network 47 from FIG. 7.

Block 28 calls for defining boundary lines connecting each of the plane nodes and each of the outlier nodes along the boundary using the processor. Each of the plane nodes and each of the outlier nodes are connected to adjacent nodes where the adjacent nodes may be plane nodes or outlier nodes. In one or more embodiments, this block may include connecting the plane nodes and the outlier nodes to form the defined boundary lines of the surface to provide a structure of the rock using the processor. FIG. 8 illustrates the connecting of the outlier nodes 48 with the plane nodes 45 in an adjacent sequence to form the boundary line 49. The defined boundary lines may be used to make up a virtual structure or model of the rock surface.

Figure 9:
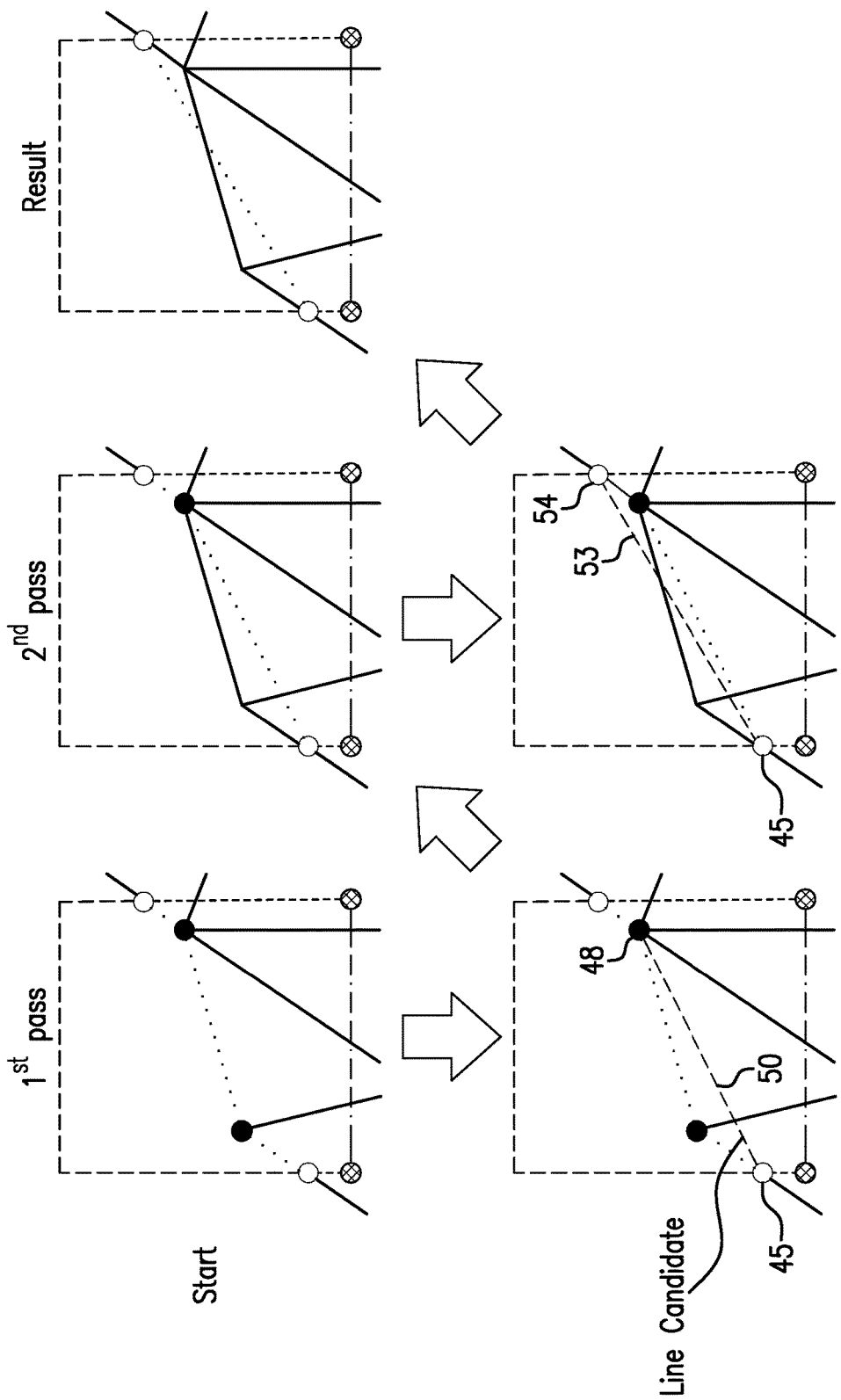
FIG. 9 depicts aspects of removing irrelevant outlier nodes.

Block 29 calls for removing an outlier node of interest using an outlier removal method to provide a final structure or model using the processor. The outlier removal method includes: placing a new line between two nodes that are adjacent to the outlier node of interest; determining a distance between the outlier node of interest and the new line; and removing the outlier node of interest and using the new line in the boundary if the distance is less than a threshold value. FIG. 9 illustrates placing a new line 50 between plane node 45 and outlier node 48. Similarly, FIG. 9 illustrates placing a new line 53 between the plane node 45 and the plane node 54. The result is the new line 53 becomes a new boundary line to form part of the boundary.

Figure 10:
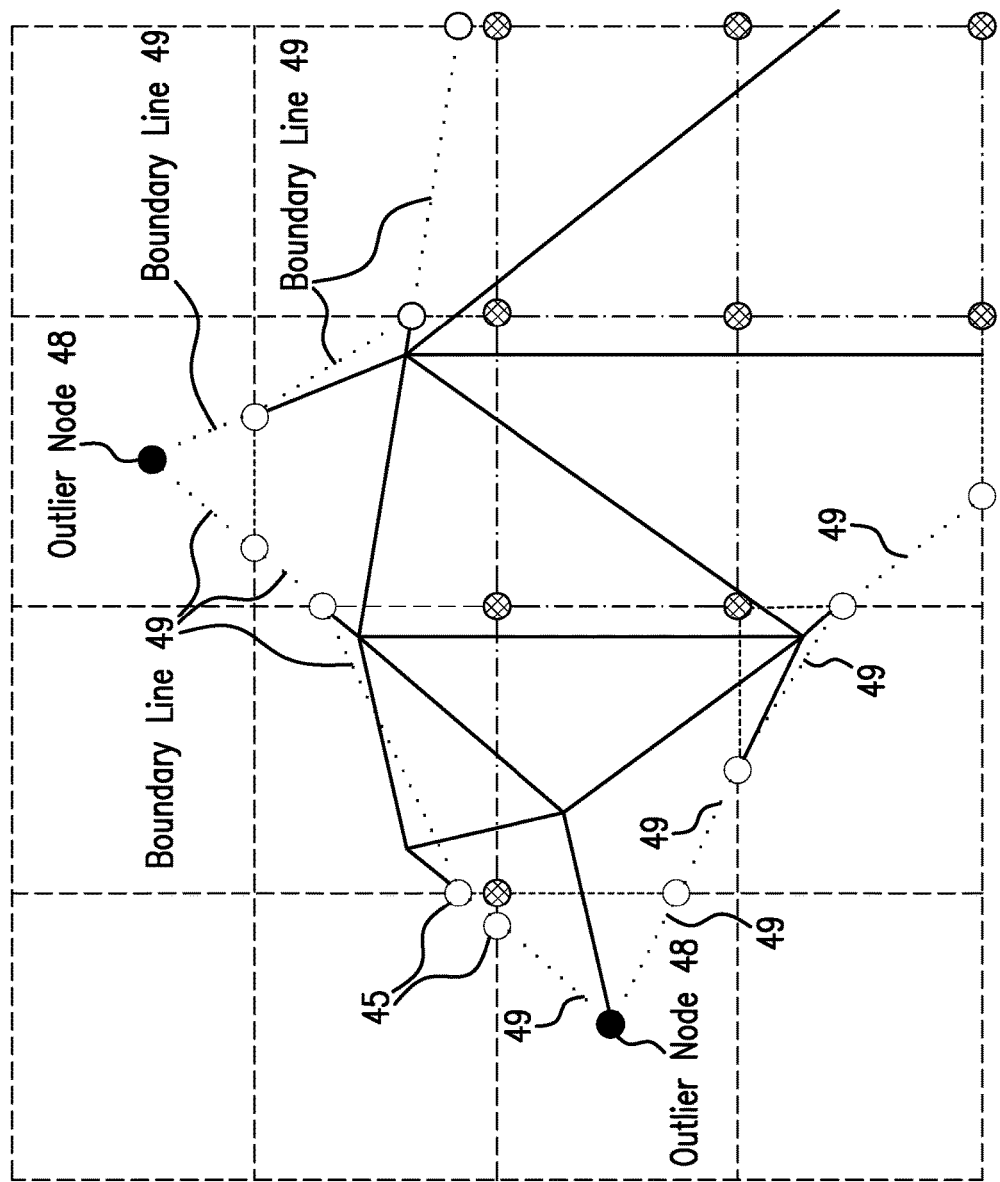
FIG. 10 depicts a resulting structure after removing irrelevant outlier nodes.
Figure 11:
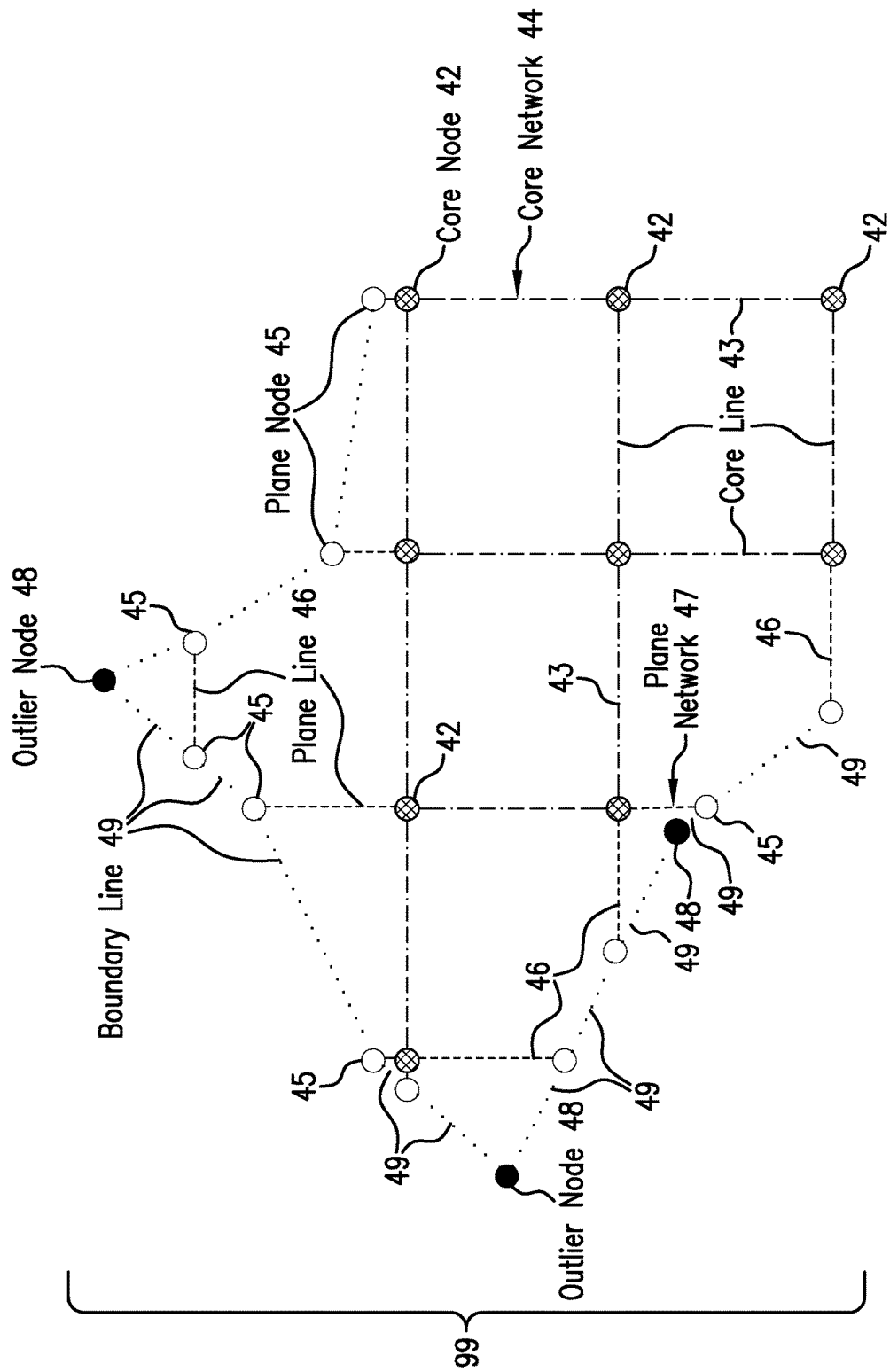
FIG. 11 depicts aspects of the resulting regular surface representation of the formation rock where it intersects with the planes of the cutting grid while retaining shape of the boundary.

FIG. 10 illustrates the boundary lines 49 forming a final boundary. FIG. 11 shows a final virtual structure 99 (or model 99), represented without the tri-mesh representation 40, which includes the full network of plane, core and outlier nodes and their relative connections.

Block 30 calls for calculating a parameter of the earth formation using the boundary lines and the processor. This block relates to further processing using the structure or model 99 (which includes the boundary lines 49) to calculate a parameter of the earth formation using algorithms known in the art. In that the structure may geometrically describe faults and how the faults are interconnected, the permeability of the formation may be calculated from the structure's information. Permeability can be used to determine a location and geometry for a future borehole for hydrocarbon production. Rock stress may also be calculated form the structure information as a non-limiting embodiment. Stress can be used to estimate the likelihood of subsidence of the formation and earth or an earthquake occurring after extraction of hydrocarbons from the formation.

Block 31 calls for operating equipment using at least one definition or the parameter in order to develop the subterranean field. Here, "definition" relates to any defined element or combination of defined elements discussed in the above blocks. In one or more embodiments, operating equipment may include operating drilling equipment for drilling a borehole into the earth formation, wherein the borehole is drilled with a drilling pressure window that is compatible with a stress calculated using the defined boundary lines. In one or more embodiments, operating equipment may include operating a hydraulic fracturing system for fracturing rock in the subterranean field, wherein a parameter of the hydraulic fracturing system is determined from the defined boundary lines. In one or more embodiments, operating equipment may include operating a production rig for producing hydrocarbons from the subterranean field. Producing hydrocarbons may include: calculating a permeability of subterranean field using the defined boundary lines; estimating an amount of producible hydrocarbons using the estimated permeability; and determining a parameter of the production rig using the estimated amount of producible hydrocarbons. This block may also include performing an action related to the earth formation, such as operating equipment or developing a subterranean field, using the calculated parameter and associated equipment for performing the action. Non-limiting embodiments include (1) drilling a new borehole at a location that was selected using the calculated permeability discussed above, (2) drilling the new borehole using drilling parameters determined from the calculated stress, (3) provide geo-steering information for drilling the new borehole resulting in the drilling borehole having suitable geometry for extracting hydrocarbons, and (4) extracting hydrocarbons using production parameters determined from the calculated stress.

The method 20 may also include developing the subterranean field using the model and development equipment. Non-limiting embodiments of developing the subterranean field may include: (1) drilling a borehole into the earth formation using drilling equipment where, for example, the borehole is drilled with a drilling pressure window that is compatible with a stress calculated using the structure of the rock; (2) fracturing rock in the subterranean field using a hydraulic fracturing system where, for example, a parameter of the hydraulic fracturing system is determined from the virtual structure or model of the rock; and (3) producing hydrocarbons from the subterranean field using a production rig. Producing hydrocarbons may further include: calculating a permeability of subterranean field using the structure or model of the rock; estimating an amount of producible hydrocarbons using the estimated permeability; and determining a parameter of the production rig (e.g., pumping flow rate) using the estimated amount of producible hydrocarbons.

Figure 12A:
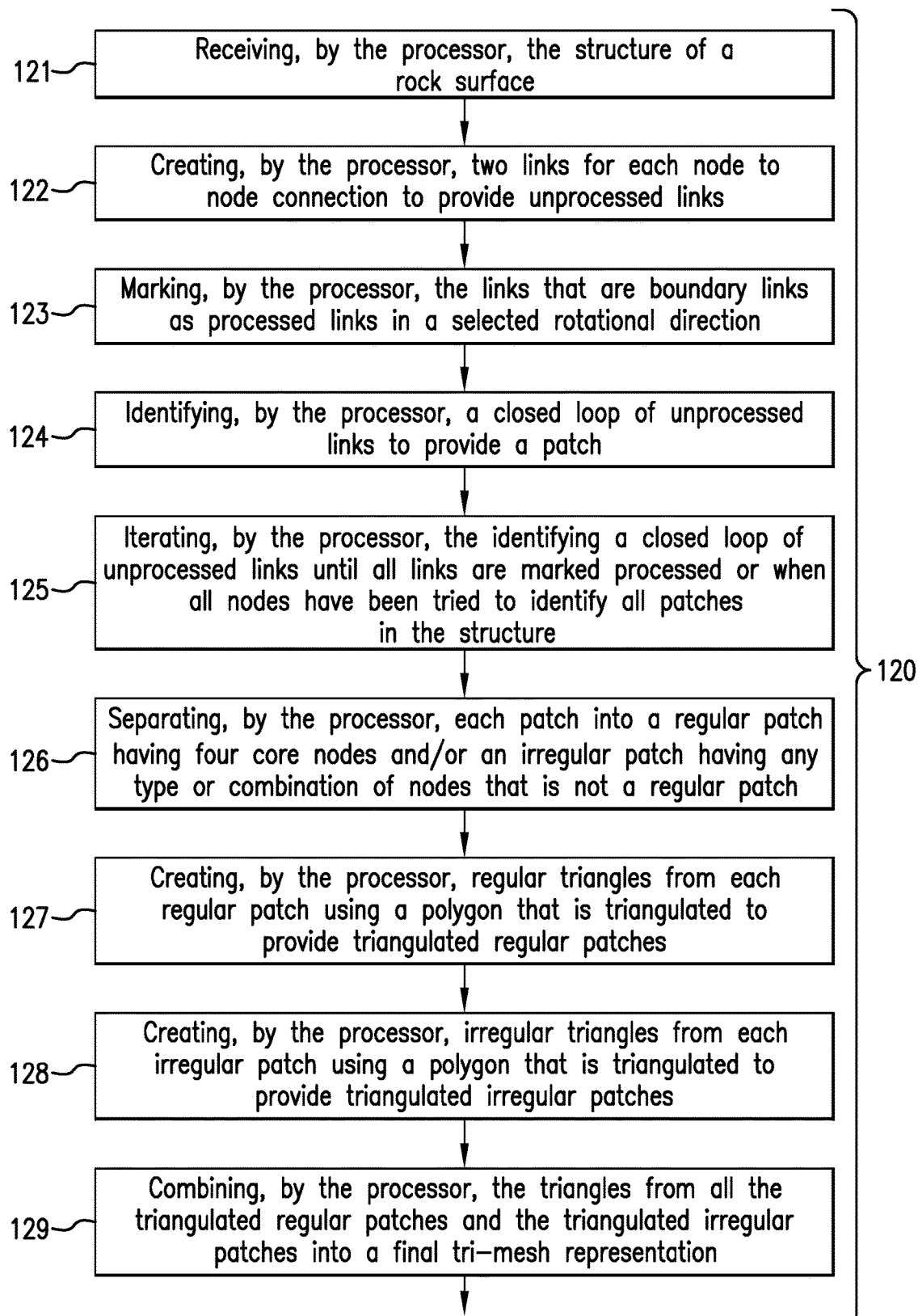
FIGS. 12A and 12B, collectively referred to as FIG. 12, present a flow chart for a method for creating regular tri-meshes from a regular structure that represents rock surfaces in an earth formation in a geological model.
Figure 12B:
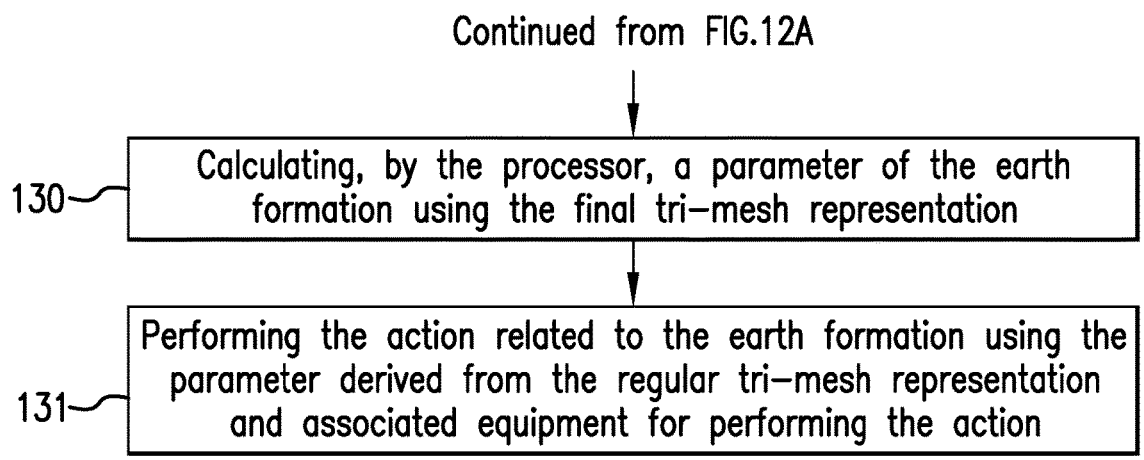
Figure 13:
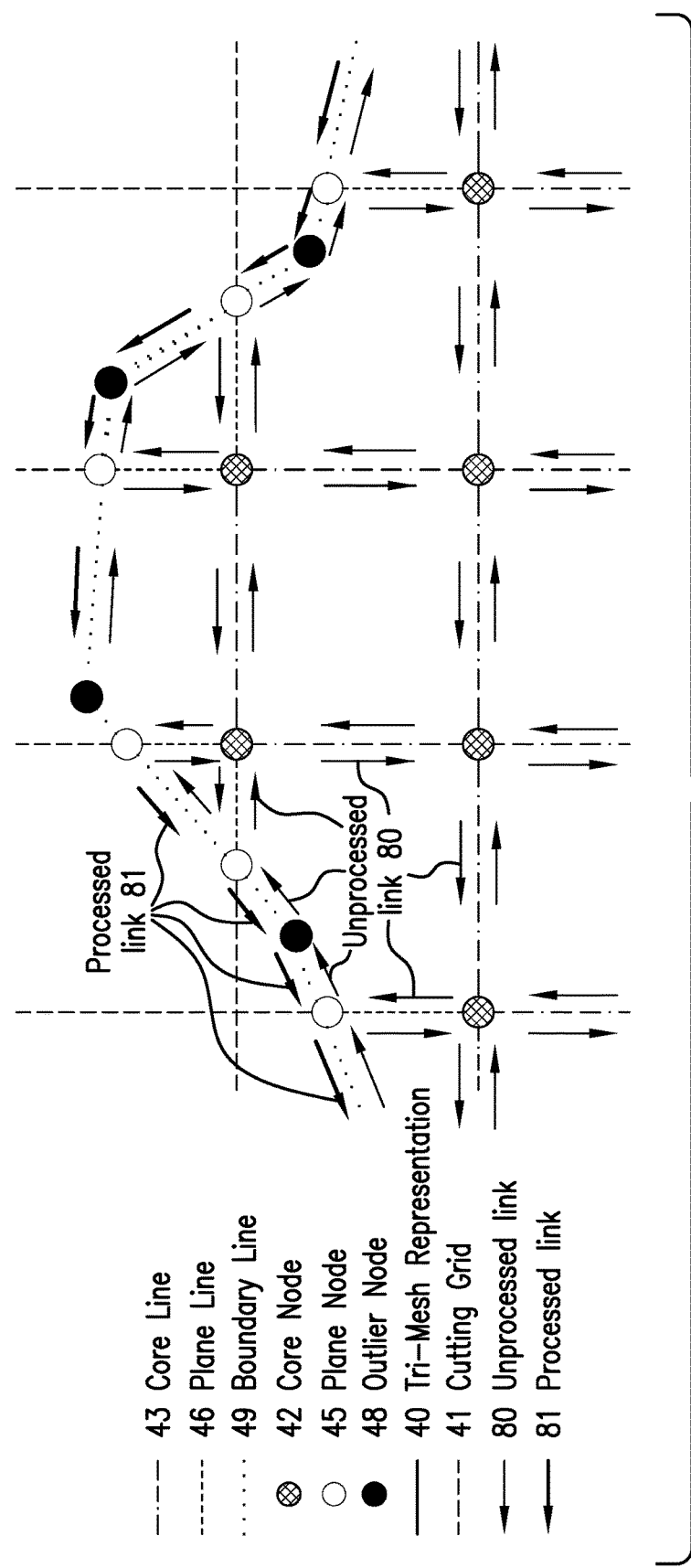
FIG. 13 depicts the regular structure representing the rock surfaces with links between the nodes.

FIG. 12 is a flow chart for a method 120 for creating a regular tri-mesh representation using a virtual structure (such as the structure or model 99) of a rock surface in a plane in an earth formation. The term "regular tri-mesh" relates to representation of a structure using regular triangles (i.e., triangles have a right angle). The regular shaped triangles simplify further processing of the structure such as to determine a property of the structure. Blocks in the method 120 are implemented by a processor such as in a computer processing system for example. Block 121 calls for receiving the virtual structure or model that represents the rock surface using a processor. One embodiment of the structure 99 is illustrated in FIG. 13. The structure 99 is created by the flow chart of FIG. 2 using method 20 and the steps described in blocks 21 through 28 or 29. The regular structure consists of core nodes 42, planes nodes 45, outlier nodes 48 connected implicitly or explicitly by core lines 43, plane lines 46 and boundary lines 49.

Block 122 calls for creating two links for each node to node connection, which are initialized as unprocessed links 80 as illustrated in FIG. 13.

Block 123 calls for marking, by the processor, the links that are boundary links as processed links 81 in a selected rotational direction, in this embodiment counter clockwise, as illustrated in FIG. 13. Other rotational directions may be used in other embodiments.

Figure 14:
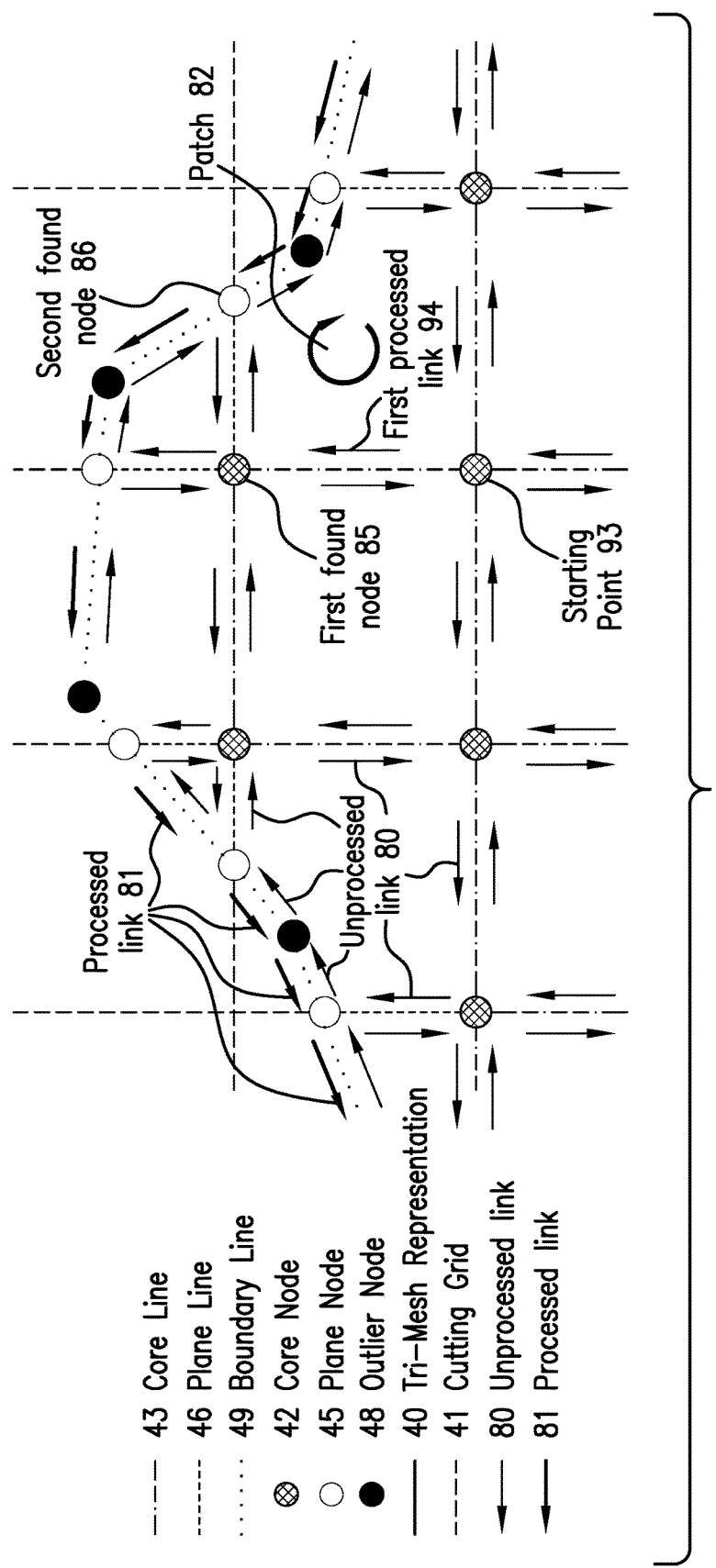
FIG. 14 depicts aspects of finding a small loop or patch in the regular structure.

Block 124 calls for identifying a closed loop of unprocessed links 80 in the structure. This closed loop of unprocessed links 80 is referred to as a patch. This patch is found by selecting an arbitrary node (either core 42, plane 45 or outlier node 48) as a starting point 93 as illustrated in FIG. 14. From this starting point 93, the first unprocessed link 94 is followed, in this case to the first found node 85 above the starting point 93. The link from starting point node 93 to node 85 is marked as processed. From here onwards, the unprocessed link is taken which results in the most clockwise turn, in this embodiment to the second found node 86 and the link between node 85 and node 86 is marked processed. This process continues until either the starting point 93 is reached, or the current node has no more unprocessed links. When the starting point 93 has been reached, a valid patch 82 has been found and the process starts again with another node. When no unprocessed links can be found for a node, the processing is reversed, and all links until the starting point 93 are marked as unprocessed links 80 again.

Block 125 calls for the process of block 124 to start again (i.e., iterating the identifying a closed loop of unprocessed links 80 in the structure) with another node. This process continues until all links are marked processed or when all nodes have been tried. At the end of block 125, all patches 82 in the structure have been found.

Figure 15:
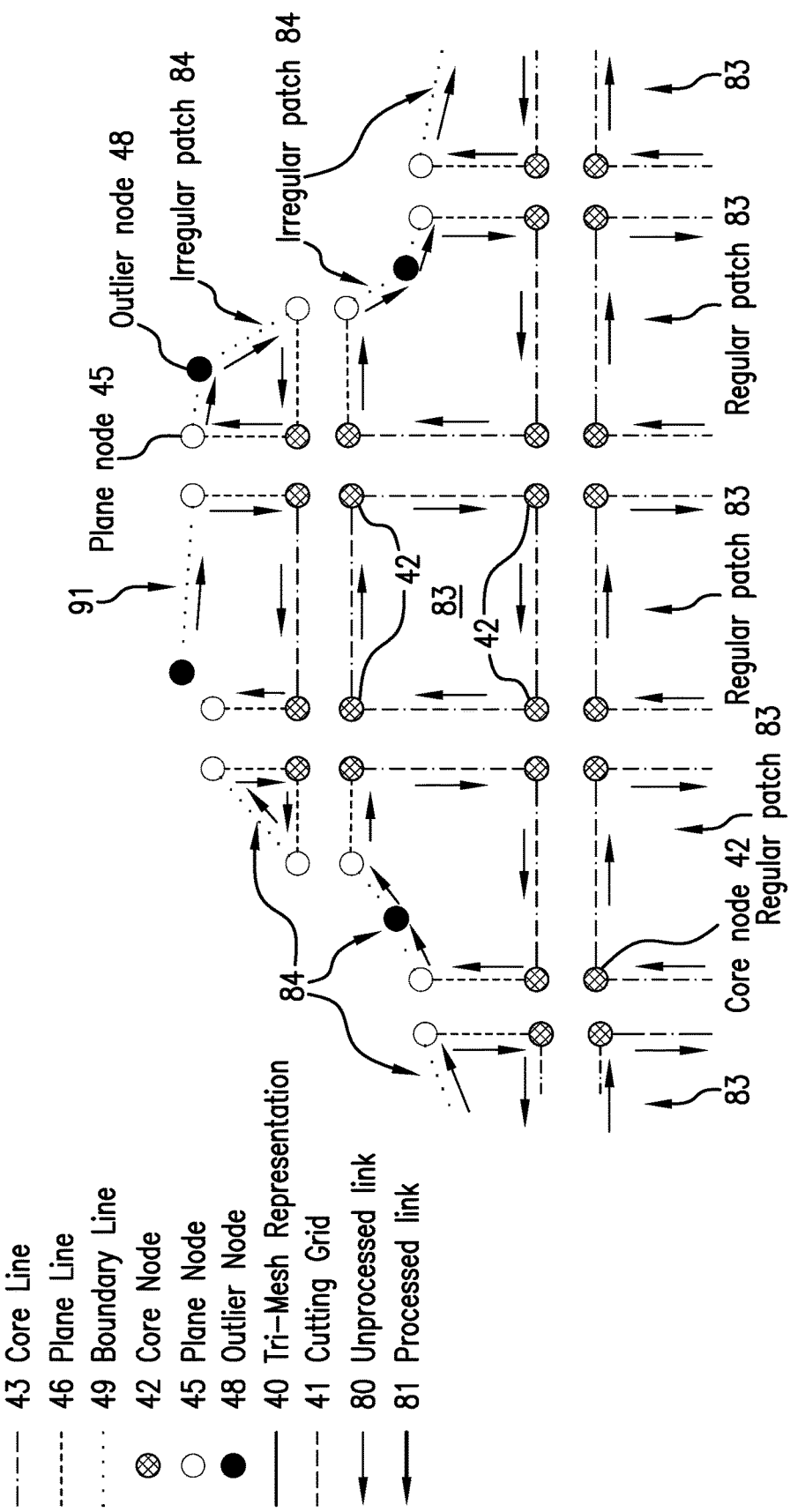
FIG. 15 depicts aspects of all patches that are found within the regular structure, both regular and irregular.

Block 126 calls for separating patches (i.e., patches 82) into regular patches and irregular patches. FIG. 15 depicts the patches 82 found in blocks 124 and 125 as separate entities. Two types of patches 82 are distinguished: regular patches 83 that include four core nodes 42, and irregular patches 84 that are not regular patches and can contain any type and combination of nodes.

Block 127 calls for creating triangles (i.e., triangles 95) from regular patches (i.e., regular patches 83). Triangles 95 and regular patches 83 are depicted in the top part of FIG. 16. For each of the regular patches 83, two triangles 95 are created which result in the triangulation of the regular patches referred to as triangulated regular patch 86 in FIG. 16.

Figure 16:
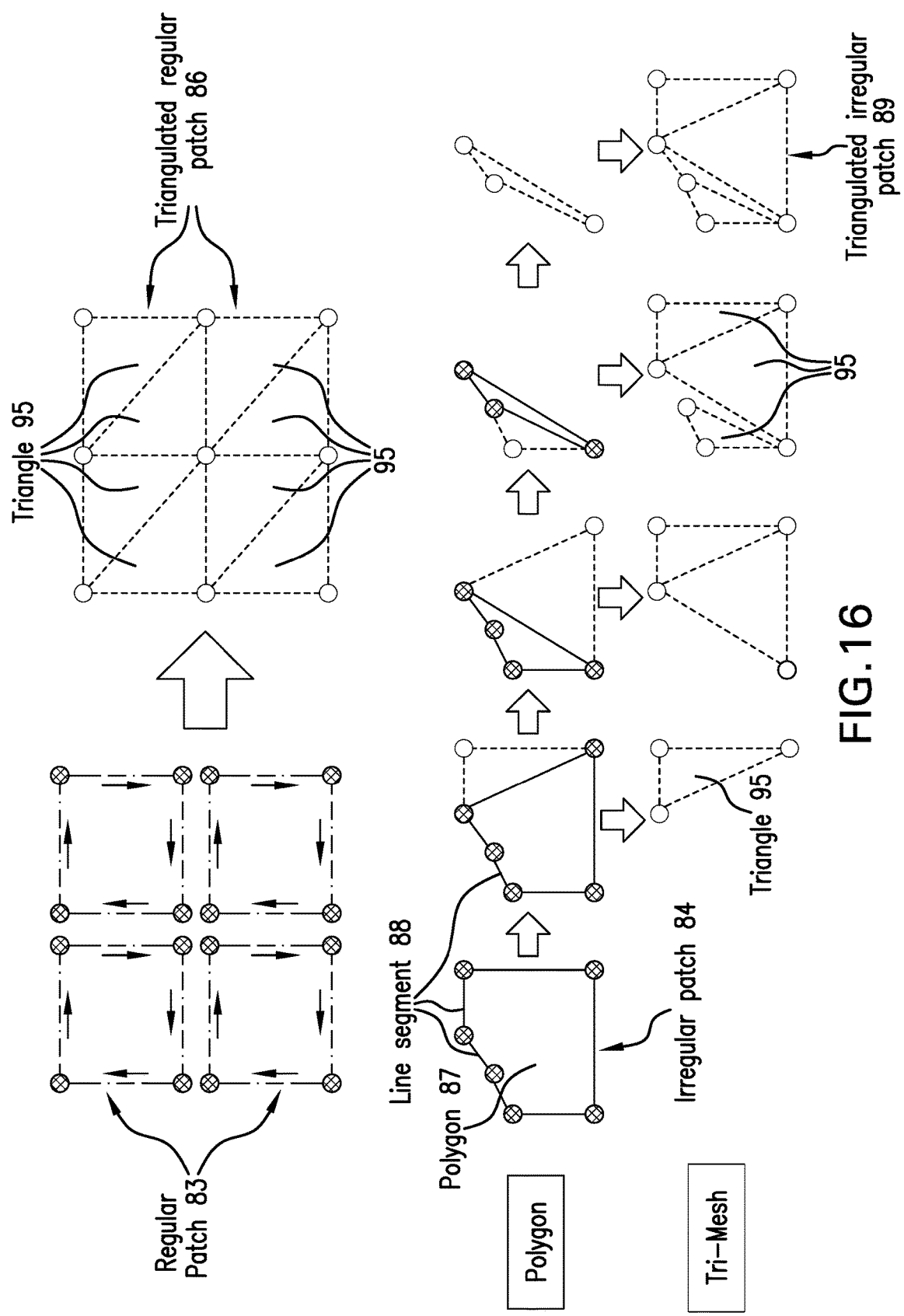
FIG. 16 depicts aspects of creating triangles from both the regular and the irregular patches.

Block 128 calls for creating triangles (i.e., triangles 95) from irregular patches (i.e., irregular patches 84), which is depicted in the bottom part of FIG. 16. For each of the irregular patches 84, a polygon is created following the links. This polygon can then be triangulated using methods known in the art, such as ear clipping. This ear clipping process is also depicted in the bottom part of FIG. 16. For each of the nodes in the polygon 87, it is checked if it is possible to remove that node and create a line segment 88 between the previous node and the next node that does not intersect with any other line segment 88 in the polygon. If this is possible, the triangle 85 is created from the previous node, current node and the next node on the polygon. This process continues until all only three-line segments remain in the polygon, which form the last triangle 85 in a triangulated irregular patch 89.

Figure 17:
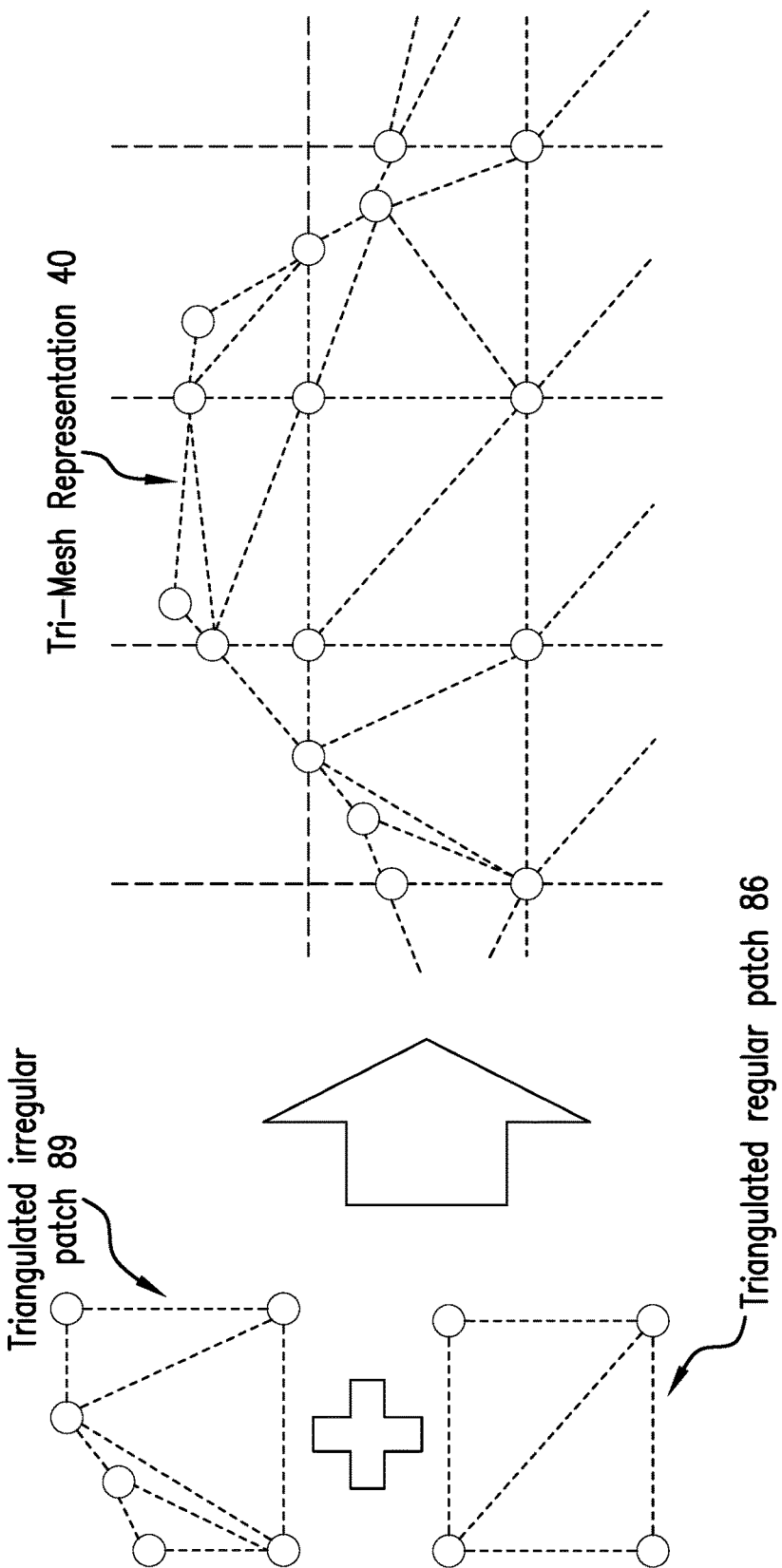
FIG. 17 depicts aspects of a resulting tri-mesh representation created from the regular structure.

Block 129 calls for combining the triangles from all the triangulated regular patches 86 and the triangulated irregular patches 89 into the final tri-mesh representation 40, as illustrated in FIG. 17.

Block 130 calls for calculating a parameter of the earth formation with the final tri-mesh representation 40 of FIG. 17 as input using the processor. This block relates to further processing using tri-mesh representation 40 to calculate a parameter of the earth formation using algorithms known in the art. In that the structure may geometrically describe faults and how the faults are interconnected, the permeability of the formation may be calculated from the structure's information. Permeability can be used to determine a location and geometry for a future borehole for hydrocarbon production. Rock stress may also be calculated from the structure information as a non-limiting embodiment. In that the likelihood of formation movement (such as subsidence or earth quakes) is mathematically related to rock stress as known in the art, the rock stress can be used to estimate the likelihood of subsidence of the formation and earth or an earthquake occurring after extraction of hydrocarbons from the formation.

Block 131 calls for operating equipment or developing the subterranean field using the calculated parameter of the earth formation and associated equipment. Non-limiting embodiments include (1) drilling a new borehole at a location that was selected using the calculated permeability discussed above, (2) drilling the new borehole using drilling parameters determined from the calculated stress, (3) provide geo-steering information for drilling the new borehole resulting in the drilling borehole having suitable geometry for extracting hydrocarbons, and (4) extracting hydrocarbons using production parameters determined from the calculated stress.

It can be appreciated that the methods disclosed herein may be performed in two-dimensions and/or three dimensions. When performed in two-dimensions, the cutting planes in the cutting grid can be interpreted as cutting lines.

Embodiment 1

A method for developing a subterranean field, the method comprising: receiving a representation of a rock surface in the subterranean field using a processor, the representation having a boundary; defining a set of grid planes over the representation using the processor; defining a plurality of core nodes at intersections of the grid planes that are within the boundary using the processor; defining core lines to connect each core node with each adjacent core node along the set of grid planes using the processor; defining a plurality of plane nodes on the grid planes where each grid plane intersects the boundary using the processor; defining plane lines to connect each plane node with each adjacent plane node along the grid planes using the processor; defining outlier nodes at each vertex of the boundary using the processor; defining boundary lines connecting each of the plane nodes and each of the outlier nodes along the boundary using the processor; and operating equipment using at least one definition in order to develop the subterranean field.

Embodiment 2

The method according to claim 1, wherein defining core lines, defining plane lines, and/or defining boundary lines comprises at least one of explicitly by using a representation of an object and implicitly by storing a mutual relationship between connecting points.

Embodiment 3

The method according to claim 1, wherein the surface is a surface of a fault.

Embodiment 4

The method according to claim 3, wherein the fault at a horizon is watertight and the surface of the fault and a surface of the horizon have overlapping locations of each structure at regularly spaced locations in three-dimensional space.

Embodiment 5

The method according to claim 1, wherein operating equipment comprises operating drilling equipment for drilling a borehole into the earth formation.

Embodiment 6

The method according to claim 5, wherein the borehole is drilled with a drilling pressure window that is compatible with a stress calculated using the defined boundary lines.

Embodiment 7

The method according to claim 1, wherein operating equipment comprises operating a hydraulic fracturing system for fracturing rock in the subterranean field.

Embodiment 8

The method according to claim 7, wherein a parameter of the hydraulic fracturing system is determined from the defined boundary lines.

Embodiment 9

The method according to claim 1, wherein operating equipment comprises operating a production rig for producing hydrocarbons from the subterranean field.

Embodiment 10

The method according to claim 9, further comprising: calculating a permeability of subterranean field using the defined boundary lines; estimating an amount of producible hydrocarbons using the estimated permeability; and determining a parameter of the production rig using the estimated amount of producible hydrocarbons.

Embodiment 11

The method according to claim 1, further comprising removing an outlier node of interest using a method comprising: placing a new line between two nodes that are adjacent to the outlier node of interest; determining a distance between the outlier node of interest and the new line; and removing the outlier node of interest and using the new line in the boundary if the distance is less than a threshold value.

Embodiment 12

The method according to claim 1, wherein the representation is a tri-mesh representation comprising a plurality of triangles, each triangle in the plurality sharing an edge with an adjacent triangle.

Embodiment 13

The method according to claim 1, further comprising a method for creating a regular tri-mesh representation of the rock surface represented by a model comprising the definitions, the method comprising: receiving, by the processor, the model of the rock surface; creating, by the processor, two links for each node to node connection to provide unprocessed links; marking, by the processor, the unprocessed links that are boundary links as processed links in a selected rotational direction; identifying, by the processor, a closed loop of unprocessed links to provide a patch; marking, by the processor, the unprocessed links that are boundary links in the patch as processed links in a selected rotational direction; iterating, by the processor, the identifying and the marking until all links are marked as processed and/or all nodes are processed; separating, by the processor, each patch into a regular patch having four core nodes and/or an irregular patch having any type or combination of nodes that is not a regular patch; creating, by the processor, regular triangles from each regular patch and/or irregular triangles from each irregular patch using a polygon that is triangulated; and combining, by the processor, the regular triangles and the irregular triangles into the regular tri-mesh representation; wherein using the at least one definition comprises using the regular tri-mesh representation.

Embodiment 14

The method according to claim 1, further comprising calculating a parameter of the subterranean field and using the parameter in the operating equipment.

Embodiment 15

The method according to claim 14, wherein the parameter is stress at a rock feature.

Embodiment 16

The method according to claim 1, wherein the method is performed in three dimensions and the representation is at a certain depth.

Embodiment 17

A method for developing a subterranean field, the method comprising: constructing, using a processor, a model of a rock surface in the subterranean field from a representation of the structure having a boundary, the model comprising: a plurality of core nodes defined at intersections of grid planes that are within the boundary, the grid planes being in a set of grid planes over the representation; core lines defined by connecting each core node with each adjacent core node along the set of grid planes; a plurality of plane nodes defined on the grid planes where each grid plane intersects the boundary; plane lines defined by connecting each plane node with each adjacent plane node along the grid planes; outlier nodes defined at each vertex of the boundary; boundary lines defined by connecting each of the plane nodes and each of the outlier nodes along the boundary; developing the subterranean field using the model and development equipment.

Embodiment 18

The method according to claim 17, wherein developing comprises drilling a borehole into the earth formation using drilling equipment.

Embodiment 19

The method according to claim 17, wherein developing comprises fracturing rock in the subterranean field using a hydraulic fracturing system.

Embodiment 20

The method according to claim 17, wherein developing comprises producing hydrocarbons from the subterranean field using a production rig.

In support of the teachings herein, various analysis components may be used, including a digital and/or an analog system. For example, the computer processing system 12, the downhole sensor 13, the drilling/production parameter controller 14, the geo-steering system 15, the seismic source 16, the seismic receiver 17, the downhole electronics 18, and/or the telemetry may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "coupled" relates to a first component being coupled to a second component either directly or indirectly via an intermediary component. The term "configured" relates to one or more structural limitations of a device that are required for the device to perform the function or operation for which the device is configured.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for developing a subterranean field, the method comprising:
   receiving a representation of a surface in the subterranean field from a sensor, the representation having a boundary;
   defining a plurality of core nodes at intersections of a grid that are within the boundary using a processor;
   defining core lines to connect each core node with each adjacent core node along the grid using the processor;
   defining a plurality of plane nodes on the grid where each grid segment intersects the boundary using the processor;
   defining plane lines to connect each plane node with each adjacent plane node along the grid using the processor;
   defining outlier nodes at each vertex of the boundary using the processor;
   defining boundary lines connecting each of the plane nodes and each of the outlier nodes along the boundary using the processor;
   generating, with the processor, a model of the subterranean field comprising at least one of rock fractures, rock faults, and transitions between different deposited rock formations using the defined boundary lines;
   calculating, with the processor, a parameter of the subterranean field using the model;
   operating equipment based on the calculated parameter of the subterranean field in order to develop the subterranean field.

2. The method according to claim 1, wherein defining core lines, defining plane lines, and/or defining boundary lines comprises at least one of using a representation of an object and storing a mutual relationship between connecting points.

3. The method according to claim 1, wherein the surface is a surface of a fault.

4. The method according to claim 3, wherein the fault at a horizon is watertight and the surface of the fault and a surface of the horizon have overlapping locations of each structure at regularly spaced locations in three-dimensional space.

5. The method according to claim 1, wherein operating equipment comprises operating drilling equipment for drilling a borehole into the subterranean field.

6. The method according to claim 5, wherein the borehole is drilled with a drilling pressure window that is compatible with a stress calculated using the defined boundary lines.

7. The method according to claim 1, wherein operating equipment comprises operating a hydraulic fracturing system for fracturing rock in the subterranean field.

8. The method according to claim 7, wherein a parameter of the hydraulic fracturing system is determined from the defined boundary lines.

9. The method according to claim 1, wherein operating equipment comprises operating a production rig for producing hydrocarbons from the subterranean field.

10. The method according to claim 9, further comprising:
calculating a permeability of the subterranean field using the defined boundary lines;
estimating an amount of producible hydrocarbons using the calculated permeability; and
determining a parameter of the production rig using the estimated amount of producible hydrocarbons.

11. The method according to claim 1, further comprising removing an outlier node of interest using a method comprising:
placing a new line between two nodes that are adjacent to the outlier node of interest;
determining a distance between the outlier node of interest and the new line; and
removing the outlier node of interest and using the new line in the boundary if the distance is less than a threshold value.

12. The method according to claim 1, wherein the representation is a tri-mesh representation comprising a plurality of triangles, each triangle in the plurality sharing an edge with an adjacent triangle.

13. The method according to claim 1, further comprising a method for creating a regular tri-mesh representation of the surface represented by a model comprising the definitions, the method comprising:
receiving, by the processor, the model of the surface;
creating, by the processor, two links for each node to node connection to provide unprocessed links;
marking, by the processor, the unprocessed links that are boundary links as processed links in a selected rotational direction;
identifying, by the processor, a closed loop of unprocessed links to provide a patch;
marking, by the processor, the unprocessed links that are boundary links in the patch as processed links in a selected rotational direction;
iterating, by the processor, the identifying and the marking until all links are marked as processed and/or all nodes are processed;
separating, by the processor, each patch into a regular patch having four core nodes and/or an irregular patch having any type or combination of nodes that is not a regular patch;
creating, by the processor, regular triangles from each regular patch and/or irregular triangles from each irregular patch using a polygon that is triangulated; and
combining, by the processor, the regular triangles and the irregular triangles into the regular tri-mesh representation;
wherein using the defined boundary lines comprises using the regular tri-mesh representation.

14. The method according to claim 1, further comprising calculating a parameter of the subterranean field and using the parameter in the operating equipment.

15. The method according to claim 14, wherein the parameter is stress at a rock feature.

16. The method according to claim 1, wherein the method is performed in three dimensions and the representation is at a certain depth.

17. The method according to claim 1, wherein the surface is a surface of a rock.

18. The method according to claim 1, wherein each grid segment comprises a plane or a line along a plane.

19. A method for developing a subterranean field, the method comprising:
constructing, using a processor, a model of a surface in the subterranean field from a representation of the surface having a boundary, the model comprising:
a plurality of core nodes defined at intersections of a grid that are within the boundary;
core lines defined by connecting each core node with each adjacent core node along the grid;
a plurality of plane nodes defined on the grid where each grid segment intersects the boundary;
plane lines defined by connecting each plane node with each adjacent plane node along the grid;
outlier nodes defined at each vertex of the boundary;
boundary lines defined by connecting each of the plane nodes and each of the outlier nodes along the boundary;
calculating, with the processor, a parameter of the subterranean field using the model;
developing the subterranean field by operating development equipment using the calculated parameter of the subterranean field.

20. The method according to claim 19, wherein developing comprises drilling a borehole into the subterranean field using drilling equipment.

21. The method according to claim 19, wherein developing comprises fracturing rock in the subterranean field using a hydraulic fracturing system.

22. The method according to claim 19, wherein developing comprises producing hydrocarbons from the subterranean field using a production rig.

* * * * *